(12) United States Patent
Gust

(10) Patent No.: US 12,492,151 B2
(45) Date of Patent: Dec. 9, 2025

(54) APPARATUS AND METHOD FOR SUBSTRATE-BACKED PORCELAIN

(71) Applicant: Thomas Gust, Barrington, IL (US)

(72) Inventor: Thomas Gust, Barrington, IL (US)

( * ) Notice: Subject to any disclaimer, the term of this patent is extended or adjusted under 35 U.S.C. 154(b) by 0 days.

(21) Appl. No.: 18/461,164

(22) Filed: Sep. 5, 2023

(65) Prior Publication Data
US 2025/0034049 A1 Jan. 30, 2025

Related U.S. Application Data

(60) Provisional application No. 63/515,553, filed on Jul. 25, 2023.

(51) Int. Cl.
*C04B 37/00* (2006.01)

(52) U.S. Cl.
CPC ........ *C04B 37/008* (2013.01); *C04B 2237/86* (2013.01)

(58) Field of Classification Search
CPC ........ B32B 18/00; B32B 37/00; C04B 37/008
See application file for complete search history.

(56) References Cited

U.S. PATENT DOCUMENTS

| | | | |
|---|---|---|---|
| 4,140,837 A * | 2/1979 | Drees | D21H 27/26 428/409 |
| 9,259,908 B2 | 2/2016 | Iizuka et al. | |
| 10,618,256 B2 | 4/2020 | Calvo | |
| 2004/0206038 A1 * | 10/2004 | Stanchfield | A47G 27/045 52/582.1 |
| 2006/0194028 A1 | 8/2006 | Moore | |
| 2008/0118713 A1 * | 5/2008 | Bordener | B27D 5/003 156/244.11 |
| 2008/0268273 A1 * | 10/2008 | O'Brien | B27D 1/00 428/528 |
| 2014/0238593 A1 * | 8/2014 | Morgeneyer | C09J 175/08 524/505 |
| 2018/0099482 A1 * | 4/2018 | Calvo | B32B 9/04 |
| 2020/0171810 A1 | 6/2020 | Lautzenhiser et al. | |

FOREIGN PATENT DOCUMENTS

| | | | |
|---|---|---|---|
| CN | 107109084 B | 8/2017 | |
| CN | 114351965 A | 4/2022 | |
| DE | 202018003474 | 12/2019 | |
| EP | 0689911 A1 * | 1/1996 | ............ B27N 7/005 |
| EP | 2684689 B1 | 1/2014 | |
| JP | 2008088801 A * | 4/2008 | |

OTHER PUBLICATIONS

Derikvand et al. "A feasibility study of using two-component polyurethane adhesive in constructing wooden structures". Journal of Forestry Research (2014) 25(2): 477-482 (Year: 2014).*

* cited by examiner

*Primary Examiner* — Alex B Efta
(74) *Attorney, Agent, or Firm* — Inspired Idea Solutions Law Firm

(57) ABSTRACT

A method and apparatus is disclosed for substrate-backed porcelain. A sheet of substrate is secured to a sheet of porcelain. A surface of the substrate is coated with adhesive. A surface of the porcelain is coated with adhesive. The surfaces are joined together by the adhesive. A force is applied across the surfaces to improve adhesion.

20 Claims, 5 Drawing Sheets

APPARATUS AND METHOD FOR SUBSTRATE-BACKED PORCELAIN

FIELD

The present disclosure generally relates to construction materials, and more particularly to sheets of porcelain.

BACKGROUND

Mankind has built shelters for thousands of years. Shelters were initially temporary, and were built of naturally occurring resources to last for a period of days, weeks, or months, including leaves, branches, and animal hides. Over time, more durable structures began to appear, such as those formed of clay, stone, and timber. Eventually, synthetic materials began to be used for construction, including brick, concrete, metals, glass, and plastics. In the recent past porcelain has been adopted as one such synthetic material, to be used as a surface covering.

Porcelain tiles are frequently used as an alternative to ceramic tiles because the porcelain material is denser and less porous than ceramic, and therefore less likely to absorb water, dirt, oils, and so forth. Porcelain has the added advantage that it can be created in any color or with any combination of colors (e.g., via printing), making it a great option for highly customizable construction. However, porcelain is also much heavier and more brittle than ceramic, so it's adoption and use comes with some complication. In fact, the tile industry has been slow to adopt porcelain due to the inherent difficulty in transporting and installing porcelain. The heavy and brittle nature of porcelain means the instance of fracturing sheets of porcelain is high, during transportation, installation, and sometimes thereafter. Once fractured, porcelain can create a safety risk to the workman who work with the product.

While ceramic tiles tend to be of a few common sizes (e.g., 12" by 12"), porcelain can be created in standard sizes or in sheets of various sizes. Furthermore, where ceramic tiles tend to be of relatively uniform thickness, porcelain sheets can be created in various thicknesses. While thinner sheets are lighter, they are much more prone to fracture. Thicker sheets are more resistant to fracture, but fracture may still occur. The larger the sheet, the greater the stresses exerted by the weight of the porcelain and the more likely for a sheet to fracture under its own weight during transportation and/or installation.

Further, thicker sheets grow increasingly heavy and costly. Porcelain is more expensive than ceramic, and that cost increases significantly as the thickness of the porcelain sheet is increased.

Installation of porcelain on a construction job also comes with its advantages and disadvantages. Where ceramic tile is used to cover a surface (e.g., a wall) piece by piece until the surface is covered, a porcelain sheet may be created to cover the surface in a single piece, or in a small number of pieces. Porcelain, like ceramic, is secured to an underlayment (e.g., concrete backer board), but due to the size of the porcelain sheet it may not rest evenly or be adhered fully to the underlayment (e.g., such as when the wall is uneven). This lack of adequate support during installation can mean the porcelain sheet is more susceptible to settling and/or fracture either during installation or at some later time during the lifetime of the porcelain sheet.

Ceramic and porcelain are quite different when it comes to resizing and making cuts. Ceramic can be cut and resized on the job site quite easily. Porcelain sheets are difficult to modify once on the job site without causing fracturing in the wrong places of the sheet. Instead, cuts made for sizing, plumbing, or for other reasons are made at the factory prior to shipment. When adjustments to need to be made on the job site, it is not uncommon for a sheet of porcelain to be completely reordered because an attempt to make adjustments went very badly and the original sheet was permanently damaged.

Therefore, a need exists to improve the ability of porcelain to resist fracturing during transport, installation, and thereafter.

SUMMARY

A surface covering comprising a sheet of porcelain and a sheet of substrate secured to the sheet of porcelain is disclosed.

A method of joining a sheet of substrate to a sheet of porcelain is disclosed comprising coating a surface of the porcelain with adhesive, coating a surface of the substrate with adhesive, and stacking the porcelain and the substrate so that the surface of the porcelain faces the surface of the substrate.

A method of joining a sheet of substrate to a sheet of porcelain comprising applying adhesive to a surface of the substrate, applying adhesive to a surface of the porcelain, locating the surface of the substrate adjacent to the surface of the porcelain, and applying compression across both surfaces to adhere the sheet of substrate to the sheet of porcelain.

BRIEF DESCRIPTION OF THE DRAWINGS

Various aspects and advantages will become apparent upon review of the following detailed description and upon reference to the drawings in which.

DETAILED DESCRIPTION

The following disclosure includes a method and apparatus for optimizing wall coverings formed of porcelain sheets. Owing to the instability and brittleness of porcelain, this disclosure presents the addition of substrate to one side of the porcelain (e.g., to the backside) to stabilize the porcelain and help the porcelain resist fracture whether during transportation and/or installation or thereafter. The addition of substrate (e.g., waterproof substrate) to one side of the porcelain greatly improves the porcelain's resistance to fracture across various sizes and thicknesses and therefore enables porcelain of thinner cross-section to be used thereby reducing overall weight. The addition of substrate therefore improves transportability and is easier to hold and lift and move by hand during installation.

Improved resistance to fracture also means the porcelain sheets may be manufactured at larger sizes without having to worry about fracture. The addition of substrate also simplifies installation in that underlayment (e.g., Hardie backer board) is not required, since the substrate may be secured directly to the structural elements of a wall (e.g., studs, concrete, etc.). Because the porcelain can be prepared at the factory with a majority of the porcelain sheet surface area adhered to the substrate, it is not as critical that installation have a high level of surface area adhesion to the building structure. Rather, it may be sufficient to achieve at least point adhesion of the substrate to the structural elements of a building structure (e.g., on a wall at several points along the surface area of the substrate). The substrate may be adhered to underlayment (e.g., cement board) with spot gluing (e.g., via silicone).

The addition of substrate to the porcelain also improves the ease at which the porcelain (e.g., porcelain sheets) may be resized and/or cut while on the job site without causing fracture. Thus, the addition of substrate to the porcelain vastly improves the usability of porcelain as an alternative material for surface coverings in construction and the above advantages may lead to greater adoption in the industry.

Figure 1:
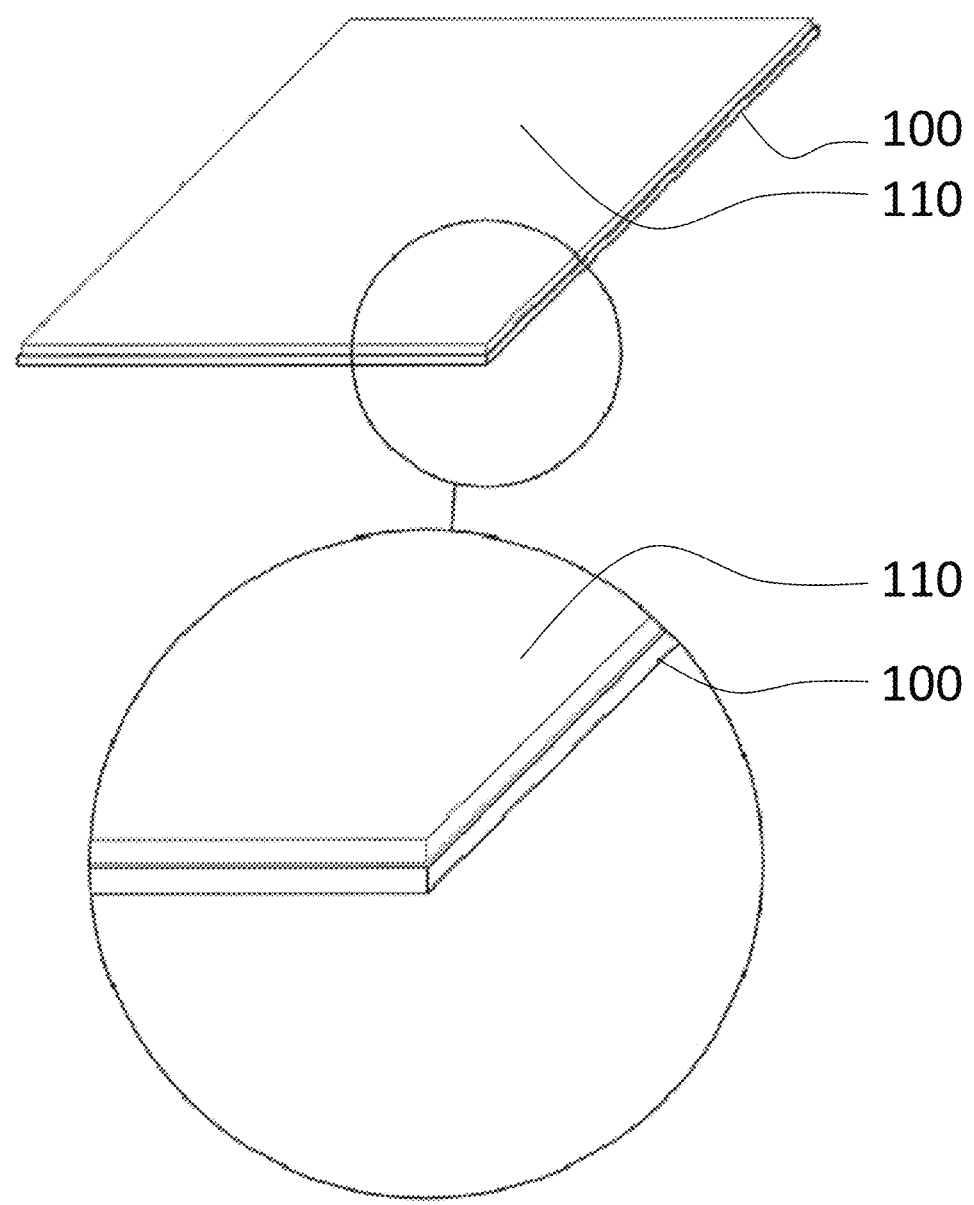
FIG. 1 illustrates a sheet of substrate secured to a sheet of porcelain.

FIG. 1 illustrates a sheet of substrate 110 secured to a sheet of porcelain 100. One corner of the assembly (circled) illustrates a zoomed in view of the sheet of porcelain 100 and the sheet of substrate 110. The sheet of porcelain 100 may be dimensioned as appropriate for its final installed position at a job site. While the sheet of porcelain 100 is represented as having a particular size and shape (e.g., a rectangle), the sheet of porcelain 100 may be manufactured in any shape appropriate for its intended use (e.g., having uneven edges, non-linear edges, cut-outs and so forth).

The sheet of porcelain 100 may be very small or very large, depending on the intended application (e.g., up to 63 inches wide by 126 inches long) and may cover an entire surface or discrete elements of a surface (e.g., an entire side of a shower stall). The sheet of porcelain 100 may be any number of thicknesses (e.g., 3.5 mm, 6 mm, 12 mm, 20 mm, ⅛ inch, 1 inch, 5 inch, ¾ inch, or more).

The sheet of substrate 110 may be sized and dimensions approximately similarly to the sheet of porcelain 100. The sheet of substrate 110 may be slightly smaller than the sheet of porcelain 100. The sheet of substrate 110 may be smaller than the sheet of porcelain 100 (e.g., smaller by ¹⁄₁₆ inches along each edge, as represented in FIG. 1). Each edge of the sheet of substrate 110 may be set in from a corresponding edge of the sheet of porcelain (e.g., by ¹⁄₁₆ inch). The inset of the sheet of substrate 110 may facilitate better sealing during installation of adjacent sheets of porcelain (e.g., as described with respect to FIG. 5).

The sheet of substrate 110 may be any suitable thickness (e.g., ⅛ inch, ¼ inch, ½ inch, or more). The thickness of the sheet of substrate 110 may be selected to adequately strengthen the sheet of porcelain 100 against fracture.

The sheet of substrate 110 may be formed of lightweight foam board or other suitable material, and may be formed of multiple layers of similar or different materials. Suitable materials may include naturally-occurring or synthetic substrates. Suitable materials may include polystyrene, expanded polystyrene (EPS), extruded polystyrene (XPS), polyurethane (PU, polyester), polyethylene (PE), polyisocyanurate (e.g., GoBoard), polyether, and/or aluminum alloy foaming. Suitable materials may include charcoal foam, closed cell foam, open cell foam, closed cell rubber, open cell rubber, high density foam, high resilience foam, latex foam, lux foam, rebond foam, Ethafoam, Volara, and/or spray foam. The sheet of substrate 110 may be unfaced or faced (e.g., foil faced, plastic faced, paper faced, clay paper faced, cotton faced, fiber glass faced, etc.).

Figure 2:
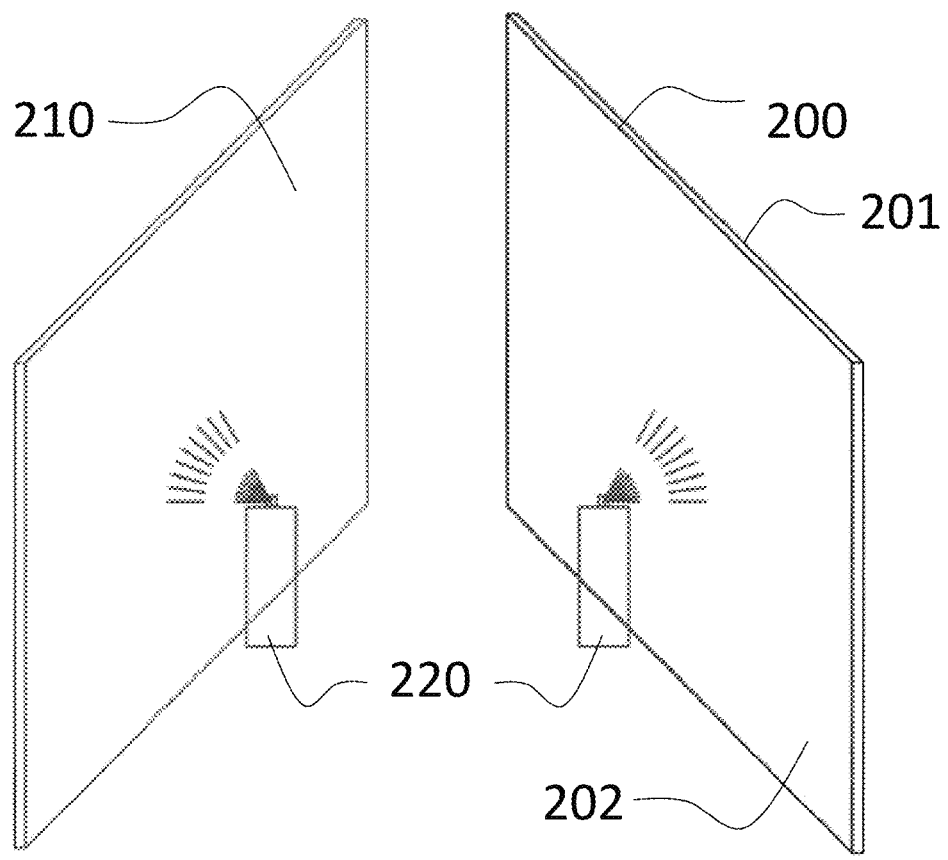
FIG. 2 illustrates adhesive being applied to a sheet of substrate and to a sheet of porcelain.

FIG. 2 illustrates adhesive 220 being applied to a sheet of substrate 210 and to a sheet of porcelain 200. The sheet of porcelain 200 and the sheet of substrate 210 are illustrated as facing each other, but this need not be the case during application of adhesive 220. Adhesive 220 may be applied across a surface of the sheet of porcelain 200 (e.g., across an entire side). The sheet of porcelain 200 may have a finished side 201 and an unfinished side 202 (e.g., a back side). Adhesive 220 may be applied across a backside surface (e.g., unfinished side 202) of the sheet of porcelain 200 (e.g., where the frontside surface is the decorated surface meant to be viewed when the porcelain 200 is installed on site). Adhesive 220 may be applied across a surface of the sheet of substrate 210 (e.g., across an entire side).

Adhesive 220 may be one or more of a spray adhesive, a paste, a liquid, a film, and/or pellets. Adhesive 220 may be one or more of a hot melt (reactive and/or nonreactive), thermosetting, pressure sensitive, and/or contact adhesive. Adhesive 220 may be structural, semi-structural, or non-structural. Adhesive 220 may be an acrylic hot-melt, acrylic resin, cyanoacrylate, epoxy, polyimide, polyurethane, and/or polyvinyl acetate adhesive. Adhesive 220 may be water resistant. Adhesive 220 may be temperature resistant. Adhesive 220 may be sprayed onto a surface of the porcelain 200. Adhesive 220 may be sprayed onto a surface of the substrate 210. Adhesive 220 may be sprayed onto a surface of the porcelain 200 and onto a surface of the substrate 210.

Figure 3:
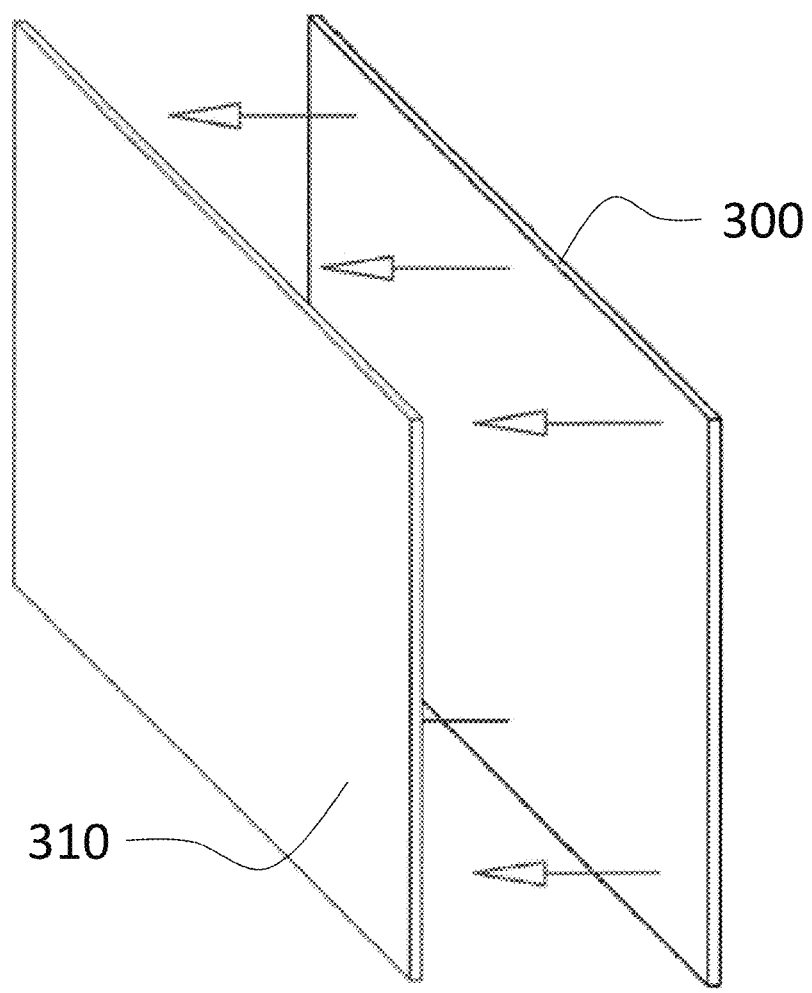
FIG. 3 illustrates a sheet of substrate located adjacent to a sheet of porcelain for adhesion.

FIG. 3 illustrates a sheet of substrate 310 located adjacent to a sheet of porcelain 300 for adhesion, such as in a stacking relationship. After the application of adhesive (e.g., as illustrated in FIG. 2), the sheet of porcelain 300 and the sheet of substrate 310 may be positioned adjacent to each other. The sheet of substrate 310 and the sheet of porcelain 300 may be moved into contact with one another (e.g., as indicated by the arrows in FIG. 3). A surface of the sheet of substrate 310 may be moved into contact with a back side (e.g., unfinished side 202) of the sheet of porcelain 300. Substrate 310 may be waterproof (e.g., having a resistance to degradation caused by water).

Figure 4:
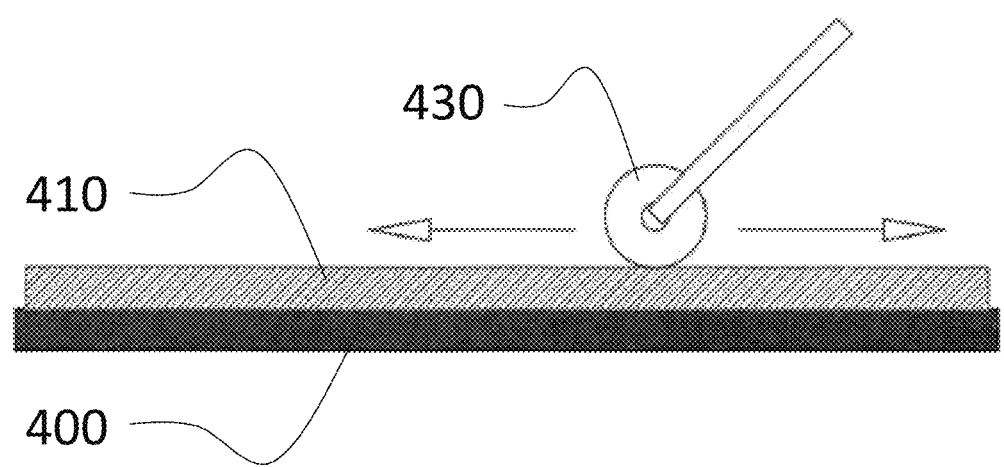
FIG. 4 illustrates a compressive force being applied across a sheet of substrate to secure the sheet of substrate to a sheet of porcelain.

FIG. 3 illustrates the sheets of material positioned or stacked substantially vertically though this need not be the case. The sheet of porcelain 300 may be positioned horizontally with the surface having adhesive facing upward, and the sheet of substrate 310 may be positioned horizontally with the surface having adhesive facing downward (e.g., as illustrated in FIG. 4) when the sheets are moved into contact. Other configurations are contemplated by this disclosure.

FIG. 4 illustrates a compressive force being applied across a sheet of substrate 410 to secure the sheet of substrate 410 to a sheet of porcelain 400. The compressive force may be exerted by a compression element 430 (e.g., a roller) such that the sheet of porcelain 400 and the sheet of substrate 410 are sandwiched or compacted between the compression element 430 and a flat surface (e.g., a force between 30 and 40 psi). While the flat surface isn't shown, it is understood that porcelain 400 would be positioned on a flat, supporting surface to prevent fracture of the sheet of porcelain 400 until after application of the sheet of substrate 410 is complete.

Thus, as the compression element 430 is moved across the sheet of substrate 410 from one side to the other, the sheet of substrate 410 and the sheet of porcelain 400 may be compressed such that a tight bond is achieved by the adhesive (e.g., adhesive 220 of FIG. 2) between the sheet of porcelain 400 and the sheet of substrate 410. After the compression force has been applied across the entire surface of the sheet of porcelain 400 and sheet of substrate 410, the assembly may be ready for transportation. The type of adhesive used may determine cure time and how soon the assembly is ready for transportation. In some embodiments cure time may be between 0 and 24 hours after compression element 430 is moved across the sheet of substrate 410 and the sheet of porcelain 400. No subsequent application of compressive force may be necessary after the use of compression element 430. The adhesive (e.g., adhesive 220 of FIG. 2) may cure after application of the compressive force by compressive element 430. Compressive force may not need to be applied during and/or throughout the curing period.

Figure 5:
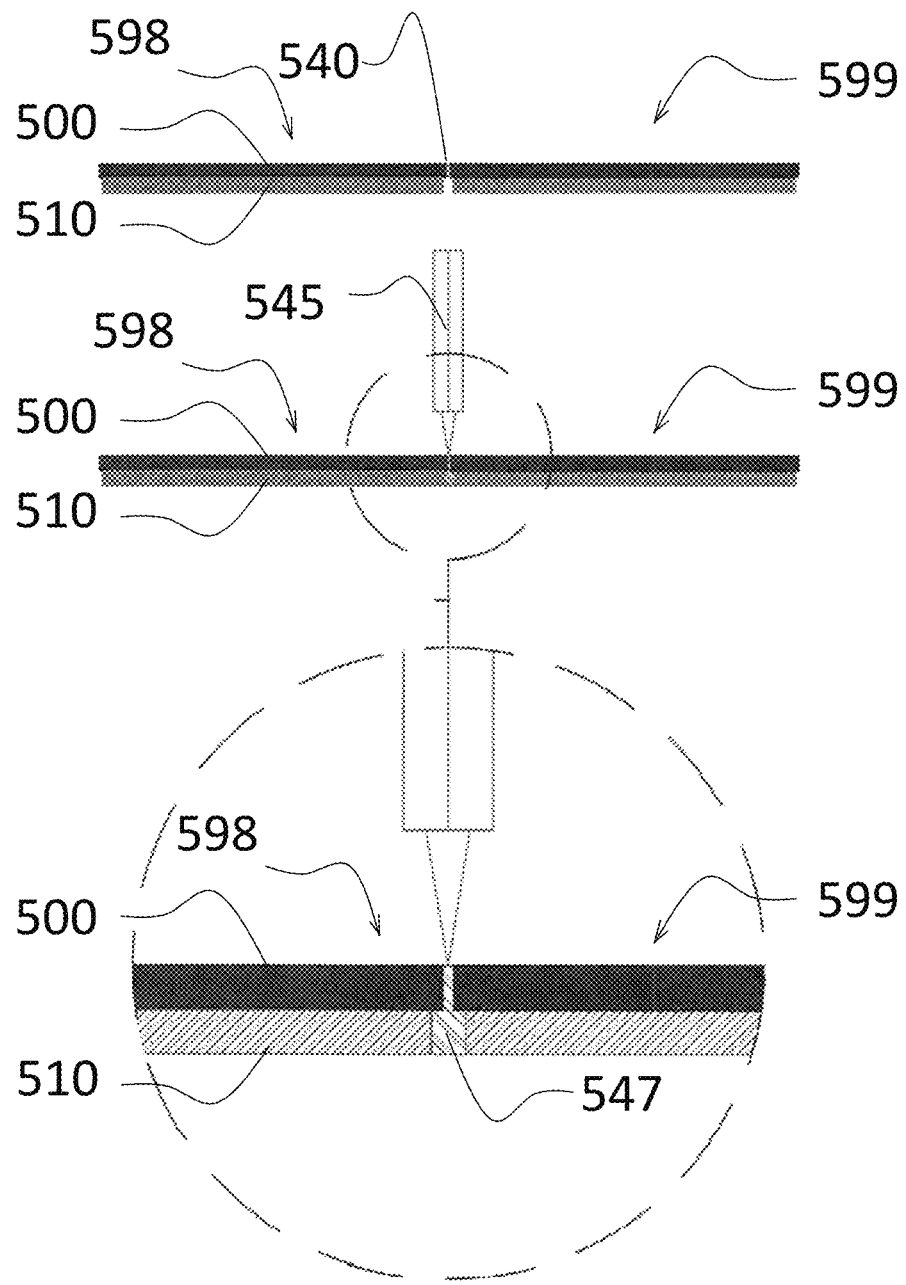
FIG. 5 illustrates adjacent sets of substrate and porcelain sheets positioned with a fill joint.

FIG. 5 illustrates adjacent sets of substrate and porcelain sheets positioned with a fill joint 540 between the adjacent sets. A first set of substrate and porcelain sheets (e.g., having a sheet of porcelain 500 and a sheet of substrate 510) forms a first construction panel 598. The first construction panel 598 may be located adjacent to a second set of substrate and porcelain sheets, forming a second construction panel 599. The first and second construction panels 598, 599 might not be in direct contact with each other (e.g., having a gap between adjacent sheets of porcelain). The gap may be $1/16^{th}$ of an inch. The gap may be ¼ of an inch. In some embodiments the gap may be between about $1/16^{th}$ of an inch and about $1/4^{th}$ of an inch.

Each construction panel 599 may be secured to a common underlayment and/or to a common structural element within a wall. Thus, a gap or fill joint 540 may exist between the first and second construction panels 599 (i.e., with the underlayment and/or structural element extending across the fill joint 540 along the substrate side of the first and second construction panels 598, 599). During installation, a sealant dispenser 545 may be positioned and/or moved along fill joint 540 to allow sealant 547 to be inserted into fill joint 540 along the length and/or width of the adjacent sheets of porcelain 500 to seal fill joint 540 and prevent the passage of moisture, oil, or other substances from one side of the sheets of porcelain 500 to the other.

Where the sheets of substrate 510 have a smaller length and/or width dimension than the sheets of porcelain 500, the fill joint 540 may have a relatively smaller gap (e.g., $1/16$ inches) between adjacent sheets of porcelain 500, and a relatively larger gap (e.g., $3/16$ inches) between adjacent sheets of substrate 510. This configuration may enable a better, more resilient seal between adjacent sets of porcelain and substrate sheets (e.g., and a more finished appearance between adjacent construction panels 598, 599).

While not illustrated, it is understood that the construction panels 598, 599 may be installed on any surface (e.g., a wall, floor, or ceiling). Adjoining construction panels 599 may be secured to any surface (e.g., a wall), with or without underlayment, since the sheets of porcelain 500 are not attached directly to the underlayment (e.g., with cement, thinset, or other cementous mixture) for support. The sheets of substrate 510 provide reinforcement for the sheets of porcelain 500, and the sheets of substrate 510 may be secured to underlayment or structural elements within the surface at discrete points, along discrete lines, or in discrete areas without a need for full adhesion across the entire surface area of each sheet of substrate 510. Once construction panels 598, 599 are installed in close proximity to each other, whether along a surface or at corners of adjoining surfaces, the corresponding fill joints between each adjacent construction panel 599 may be filled in the manner described in this disclosure.

Construction panels 598, 599 may be manufactured in any of a range of sizes, and may be configured in standardized sizes (e.g., 12 inch by 24 inch) or may be configured in customized sizes as required at each job site. Construction panels 598, 599 may be 39 inches by 96 inches. Construction panels 598, 599 may be 31.5 inches by 63 inches. Construction panels 598, 599 may be 31.5 inches by 31.5 inches. Construction panels 598, 599 may be 30.5 inches by 30.5 inches. Construction panels 598, 599 may be 63 inches wide by 126 inches long). Nevertheless, construction panels 598, 599 may be easily modified on the job site to fit into any space, since the substrate backing may provide support to the porcelain to resist fracture during fitting work (e.g., cutting, drilling). The dense, non-porous nature of porcelain makes the construction panels 598, 599 well suited for use in wet environments, including kitchens, bathrooms, tub/shower areas, and for exterior use, though it is conceivable that construction panels 598, 599 may be used on any surface.

Other aspects will be apparent to those skilled in the art from consideration of the specification and practice disclosed herein. It is intended, therefore, that the specification and illustrated embodiments be considered as examples only.

What is claimed is:

1. A method of joining a substrate sheet to a porcelain sheet with adhesive, the porcelain sheet having a finished side and a back side, the method comprising:
    applying a surface of the porcelain sheet back side with adhesive;
    stacking the porcelain sheet and the substrate sheet so that the surface of the porcelain sheet back side faces a surface of the substrate sheet; and
    joining the surface of the porcelain sheet back side to the surface of the substrate sheet, wherein the substrate sheet is between zero and an eighth of an inch different in length and width than the porcelain sheet, and wherein the porcelain sheet does not adhere to a side surface of the substrate.

2. The method of claim 1, wherein the adhesive is waterproof.

3. The method of claim 1, wherein joining the surface of the porcelain sheet back side to the surface of the substrate sheet includes applying a force across the entire substrate sheet.

4. The method of claim 3, wherein the force applied across the entire substrate sheet is between about thirty pounds per square inch and about forty pounds per square inch.

5. The method of claim 3, wherein the compressive force is not applied during a cure time of the adhesive.

6. The method of claim 1, wherein a cure time after joining the porcelain sheet back side to the surface of the substrate sheet is between about zero and about 24 hours.

7. The method of claim 1, wherein the substrate sheet is lightweight relative to the porcelain sheet.

8. The method of claim 1, wherein the substrate is lightweight foam board relative to the porcelain sheet.

9. The method of claim 1, wherein the stacking the substrate sheet and the porcelain sheet adjacently includes stacking the substrate sheet and the porcelain sheet horizontally.

10. The method of claim 1, wherein a cure time after joining the porcelain sheet back side to the surface of the substrate sheet is between about zero and about 10 minutes.

11. A method of creating a surface covering, the method consisting of:

selecting a porcelain sheet with a porcelain back side;
selecting a foam board having a board back surface and board side surfaces;
applying an adhesive to the porcelain back side;
stacking the porcelain sheet and the foam board so the porcelain back side faces the board back surface; and
joining the porcelain back side to the board back surface, wherein the porcelain sheet does not contact the board side surfaces.

12. The method of claim 11, wherein joining the porcelain sheet to the foam board includes applying compressive force across both the porcelain sheet and the foam board to adhere the foam board to the porcelain sheet.

13. A method of creating a surface covering, the method comprising:
    selecting a porcelain sheet having a porcelain finished side and a porcelain back side;
    selecting a foam board having a board back surface and board side surfaces, wherein the foam board is up to an eighth of an inch different in length and width than the porcelain sheet;
    applying an adhesive to the porcelain back side;
    locating the board back surface adjacent to the porcelain back side; and
    applying compressive force across both the porcelain back side and the board back surface to adhere the foam board to the porcelain sheet, wherein the foam board is up to an eighth of an inch smaller in length and width than the porcelain sheet, and wherein the porcelain sheet does not contact the board side surfaces.

14. The method of claim 13, wherein the adhesive is waterproof.

15. The method of claim 13, wherein the compressive force is between about thirty pounds per square inch and about forty pounds per square inch.

16. The method of claim 13, wherein compressive force is not applied during a cure time of the adhesive.

17. The method of claim 13, wherein a cure time after joining the porcelain back side to the board back surface is between about zero and about 24 hours.

18. The method of claim 13, wherein the foam board is waterproof.

19. The method of claim 13, wherein the foam board is lightweight relative to the porcelain sheet.

20. The method of claim 13, wherein the locating the board back surface and the porcelain back side adjacently includes locating the foam board and the porcelain sheet horizontally.

* * * * *